(12) United States Patent
Noguchi et al.

(10) Patent No.: US 10,732,308 B2
(45) Date of Patent: Aug. 4, 2020

(54) RADIATION DETECTION DEVICE

(71) Applicant: FUJIFILM Corporation, Tokyo (JP)

(72) Inventors: Shinsuke Noguchi, Kanagawa (JP);
Masateru Tateishi, Kanagawa (JP);
Hisatsugu Horiuchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/230,129

(22) Filed: Dec. 21, 2018

(65) Prior Publication Data

US 2019/0196034 A1 Jun. 27, 2019

(30) Foreign Application Priority Data

Dec. 22, 2017 (JP) .................................. 2017-246646

(51) Int. Cl.
*G01T 7/00* (2006.01)
*G03B 42/02* (2006.01)
*G01T 1/20* (2006.01)

(52) U.S. Cl.
CPC .............. *G01T 7/00* (2013.01); *G01T 1/2018* (2013.01); *G03B 42/02* (2013.01)

(58) Field of Classification Search
CPC .......... G01T 1/2018; G01T 1/20; G01T 7/00; A61B 6/4283; G03B 42/02
See application file for complete search history.

(56) References Cited

U.S. PATENT DOCUMENTS

| | | | | |
|---|---|---|---|---|
| 2004/0211909 | A1* | 10/2004 | Watanabe | ............... G03B 42/02 250/370.11 |
| 2006/0157658 | A1 | 7/2006 | Watanabe | |
| 2009/0014659 | A1 | 1/2009 | Hennessy et al. | |
| 2011/0204239 | A1 | 8/2011 | Yoshida et al. | |
| 2012/0195409 | A1 | 8/2012 | Suwa | |
| 2015/0247935 | A1* | 9/2015 | Toyama | .................... G01T 1/20 250/366 |
| 2015/0293237 | A1* | 10/2015 | Suzuki | .................. G03B 42/04 250/369 |

FOREIGN PATENT DOCUMENTS

| | | | | |
|---|---|---|---|---|
| GB | 201505167 | * | 5/2015 | ............. G03B 42/04 |
| JP | 2004-321568 A | | 11/2004 | |
| JP | 2009-20099 A | | 1/2009 | |
| JP | 2010-262134 A | | 11/2010 | |
| JP | 2011-69740 A | | 4/2011 | |
| WO | WO 2012/165155 A | | 12/2012 | |

OTHER PUBLICATIONS

Extended European Search Report dated Apr. 18, 2019 for European Patent Application No. 18213055.9.

* cited by examiner

*Primary Examiner* — David P Porta
*Assistant Examiner* — Fani Boosalis
(74) *Attorney, Agent, or Firm* — Birch, Stewart, Kolasch & Birch, LLP

(57) ABSTRACT

A radiation detection device includes: a radiation detection panel; a supporting member that supports the radiation detection panel at a side of a first surface of the supporting member; and a housing that accommodates the radiation detection panel and the supporting member, and the supporting member has one or more concave portions at the first surface.

20 Claims, 14 Drawing Sheets

RADIATION DETECTION DEVICE

CROSS-REFERENCE TO RELATED APPLICATIONS

This application claims the benefit of Japanese Patent Application JP 2017-246646, filed Dec. 22, 2017, the entire content of which is hereby incorporated by reference, the same as if set forth at length.

BACKGROUND OF THE INVENTION

1. Field of the Invention

The present invention relates to a radiation detection device.

2. Description of the Related Art

A so-called flat panel detector (FPD) is used to acquire a radiographic image of an object. The FPD comprises, for example, a scintillator that emits fluorescence corresponding to the amount of incident radiation and a detection substrate on which pixels detecting the fluorescence emitted from the scintillator are two-dimensionally arranged. Radiation transmitted through the object is incident on the scintillator and each pixel converts the fluorescence generated from the scintillator into an electric signal. Radiographic image data of the object is generated on the basis of the electric signal output from each pixel. A so-called electronic cassette in which an FPD is accommodated in a housing and which is portable has been known as the radiation detection device comprising the FPD (for example, see JP2004-321568A, JP2009-020099A, and JP2011-069740A).

A radiography apparatus disclosed in JP2004-321568A comprises a base that supports a radiation detection panel which is an FPD. An upper surface of the base to which the radiation detection panel is fixed is a flat surface. A plurality of concave portions are formed in a lower surface of the base. In addition, a reinforcing plate that covers the concave portions is fixed to the lower surface of the base. The base is made of a material with high rigidity, such as an aluminum alloy. The reinforcing plate is made of, for example, an aluminum alloy.

A digital X-ray detector disclosed in JP2009-020099A comprises a panel supporting member that supports an X-ray detection sensor which is an FPD. The panel supporting member includes a supporting layer and a low-density core member adhered to the supporting layer. The X-ray detection sensor is adhered to the low-density core member. The supporting layer is made of, for example, a carbon fiber reinforced plastic material and the low-density core member is made of, for example, a foamed material.

An X-ray imaging apparatus disclosed in JP2011-069740A comprises a supporting member that supports an X-ray detection sensor which is an FPD. A supporting surface of the supporting member to which an X-ray detection panel is bonded is a flat surface. A convex portion is formed on a rear surface opposite to the supporting surface of the supporting member. A concave portion that is fitted to the convex portion is formed in the bottom of a housing which faces the rear surface.

SUMMARY OF THE INVENTION

In the radiography apparatus disclosed in JP2004-321568A, the reinforcing plate is fixed to the lower surface of the base to increase the rigidity of the base. However, the reinforcing plate is made of, for example, an aluminum alloy and is relatively heavy, similarly to the base. Therefore, there is a concern that the reinforcing plate will hinder the weight reduction of the radiography apparatus.

In the digital X-ray detector disclosed in JP2009-020099A, the panel supporting member includes the supporting layer and the low-density core member which is adhered to the supporting layer and is made of a foamed material. The X-ray detection sensor is adhered to the low-density core member. In general, the foamed material has low adhesion. In a case in which an impact is applied to the digital X-ray detector, the position of the low-density core member deviates from the position of the supporting layer and the position of the X-ray detection sensor deviates from the position of the panel supporting member. As a result, there is a concern that the X-ray detection panel will be damaged.

In the X-ray imaging apparatus disclosed in JP2011-069740A, the supporting surface of the supporting member is a flat surface and the convex portion is formed on the rear surface of the supporting member. Since the weight of the convex portion is added, there is a concern that the supporting member will hinder the weight reduction of the X-ray imaging apparatus.

The invention has been made in view of the above-mentioned problems and an object of the invention is to provide a radiation detection device that can reduce the weight of a supporting member supporting a radiation detection panel, improve the rigidity of the supporting member, and prevent the damage of the radiation detection panel.

According to an aspect of the invention, there is provided a radiation detection device comprising: a radiation detection panel; a supporting member that supports the radiation detection panel with a first surface; and a housing that accommodates the radiation detection panel and the supporting member. The supporting member has one or more concave portions provided in the first surface.

According to the invention, it is possible to provide a radiation detection device that can reduce the weight of a supporting member supporting a radiation detection panel, improve the rigidity of the supporting member, and prevent the damage of the radiation detection panel.

DESCRIPTION OF THE PREFERRED EMBODIMENTS

Figure 1:
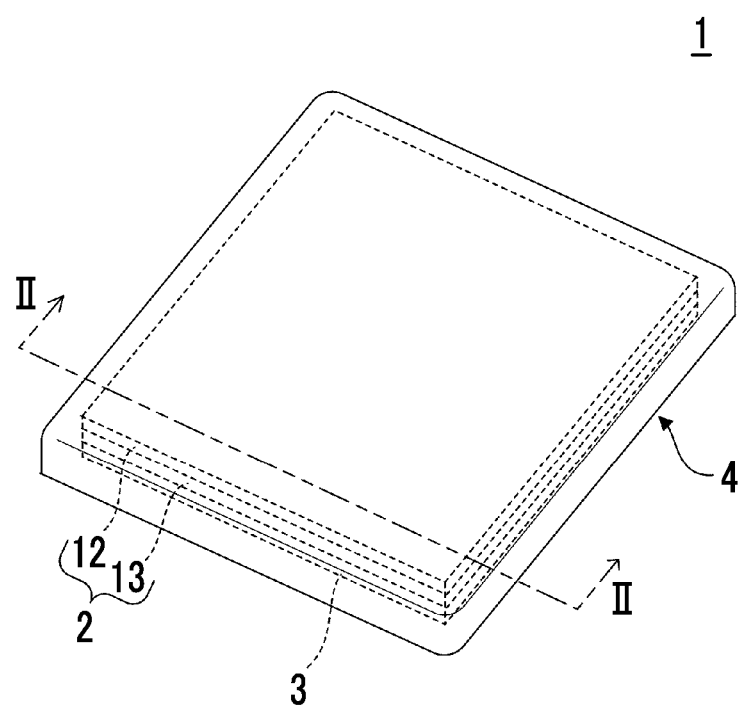
FIG. 1 is a perspective view illustrating an example of a radiation detection device for describing an embodiment of the invention.
Figure 2:
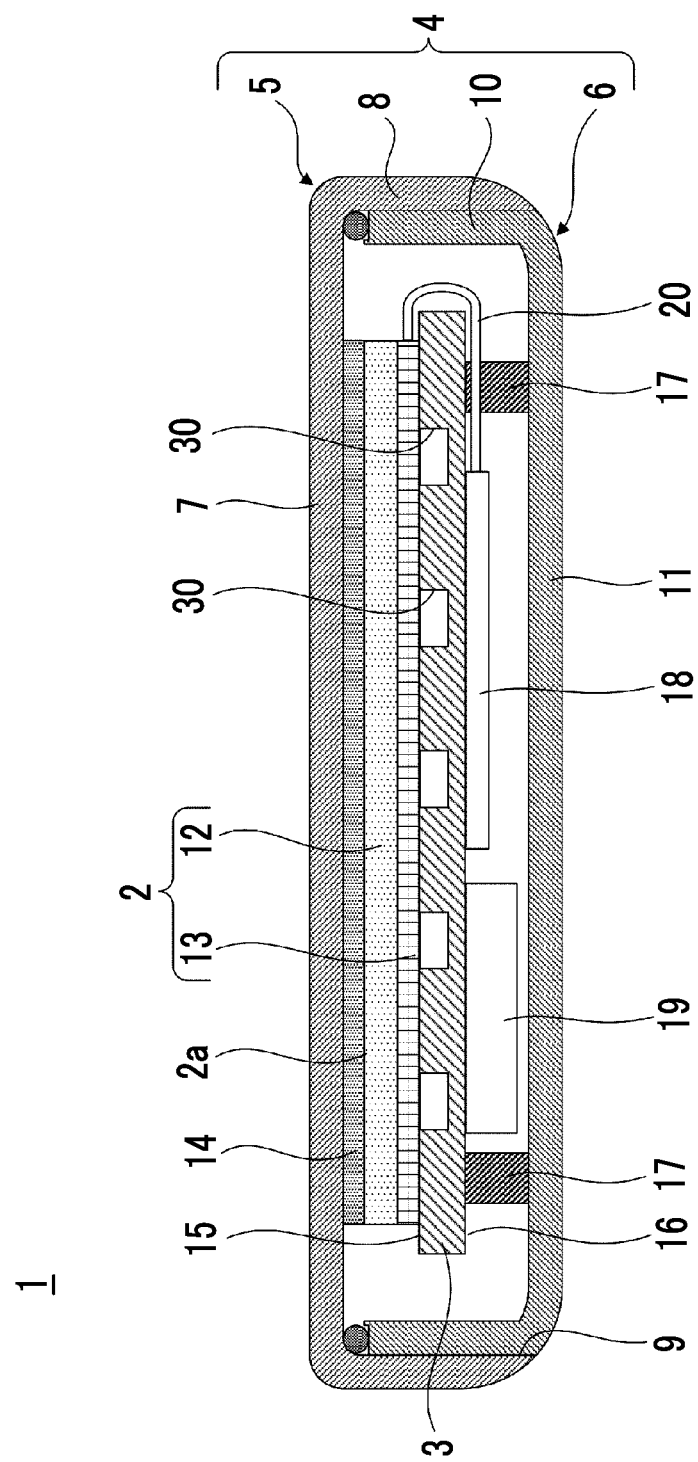
FIG. 2 is a cross-sectional view taken along the line II-II of FIG. 1.

FIGS. 1 and 2 illustrate an example of a radiation detection device for describing an embodiment of the invention.

A radiation detection device 1 illustrated in FIGS. 1 and 2 is a so-called electronic cassette and comprises a radiation detection panel 2 that detects radiation, such as X-rays, a supporting member 3 that supports the radiation detection panel 2, and a housing 4 that accommodates the radiation detection panel 2 and the supporting member 3.

The housing 4 is formed in a rectangular parallelepiped shape and typically has a size based on the International Organization for Standardization (ISO) 4090:2001. The housing 4 includes a front member 5 and a back member 6.

In the front member 5, a top plate 7 that covers a radiation incident surface 2a of the radiation detection panel 2 and an outer frame 8 that surrounds the outer periphery of the radiation detection panel 2 are integrally formed. It is preferable that the front member 5 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more. The front member 5 is preferably made of a resin material, such as a fiber reinforced resin with high radiation transmittance, in consideration of the formation of the top plate 7 transmitting radiation.

In the back member 6, an inner frame 10 that is fitted inside the outer frame 8 and a bottom 11 that is provided in an opening portion 9 opposite to the top plate 7 of the front member 5 are integrally formed. The back member 6 covers the opening portion 9. It is preferable that the back member 6 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more.

The radiation detection panel 2 is formed in a rectangular shape, includes a scintillator 12 and a detection substrate 13, and is provided behind the top plate 7 in the housing 4. In the specification, the rectangular shape is not limited to a quadrangle with right-angled corners and includes a quadrangle with chamfered corners or a quadrangle with rounded corners. The scintillator 12 has a phosphor, such as CsI:Tl (thallium-activated cesium iodide) or GOS ($Gd_2O_2S$:Tb, terbium-activated gadolinium oxysulfide) and emits fluorescence corresponding to the amount of incident radiation. The detection substrate 13 includes a plurality of pixels that are two-dimensionally arranged, detects fluorescence generated by the scintillator 12 with the pixels, and converts the detected fluorescence into an electric signal.

In the example illustrated in FIGS. 1 and 2, the scintillator 12 and the detection substrate 13 are stacked in the order of the scintillator 12 and the detection substrate 13 from the top plate 7 of the housing 4. However, the scintillator 12 and the detection substrate 13 may be stacked in the order of the detection substrate 13 and the scintillator 12 from the top plate 7. In addition, a direct-conversion-type radiation detection panel may be used in which a photoconductive film of each pixel of the detection substrate 13 that generates signal charge is made of, for example, amorphous selenium and which directly converts radiation into signal charge.

A buffer member 14 is provided between the radiation incident surface 2a of the radiation detection panel 2 and the top plate 7 of the housing 4 which covers the radiation incident surface 2a. In a case in which the load of the object is applied to the top plate 7, the buffer member 14 disperses the load and prevents local stress from being applied to the radiation detection panel 2. The buffer member 14 is made of a foamed material such as foamed silicone or foamed urethane.

The supporting member 3 is a plate-shaped member and is formed in a rectangular shape. The supporting member 3 has a first surface 15 that faces the top plate 7 of the housing 4 and a second surface 16 that is opposite to the first surface 15. The radiation detection panel 2 is supported by the first surface 15 of the supporting member 3.

The supporting member 3 is supported by a plurality of spacers 17 provided on the second surface 16 of the supporting member 3. The spacer 17 protrudes from the second surface 16 to the bottom 11 of the housing 4 facing the second surface 16 and comes into contact with the bottom 11. An appropriate space is formed between the supporting member 3 and the bottom 11.

A circuit substrate 18 is provided between the supporting member 3 and the bottom 11. For example, a driving control circuit that controls the driving of the detection substrate 13, a signal processing circuit that processes the electric signal output from the detection substrate 13, a communication circuit for communication with the outside, and a power circuit are formed on the circuit substrate 18. The circuit substrate 18 is schematically illustrated as a single element in FIG. 2. However, the circuit substrate 18 may be divided into a plurality of circuit substrates and the plurality of circuit substrates may be dispersed between the supporting member 3 and the bottom 11.

In addition, a power supply unit 19 that supplies power to the detection substrate 13 and the circuit substrate 18 is provided between the supporting member 3 and the bottom 11. The power supply unit 19 is a rechargeable battery, such as a lithium-ion secondary battery, or a capacitor, such as an electric double layer capacitor or a lithium-ion capacitor. The power supply unit 19 is schematically illustrated as a single element in FIG. 2. However, the power supply unit 19 may be divided into a plurality of power supply units and the plurality of power supply units may be dispersed between the supporting member 3 and the bottom 11.

The detection substrate 13 of the radiation detection panel 2 which is provided on the first surface 15 of the supporting member 3 and the circuit substrate 18 which is provided on the second surface 16 of the supporting member 3 are connected to each other by a flexible substrate 20. The flexible substrate 20 protrudes from the outer periphery of the radiation detection panel 2 to the outer frame 8 and the inner frame 10, is bent in an arch shape so as to pass between the supporting member 3 and the outer frame 8 and the inner frame 10 of the housing 4, and is connected to the circuit substrate 18.

The supporting member 3 has one or more concave portions. The concave portions are provided in the first surface 15 supporting the radiation detection panel 2. In the example illustrated in FIG. 2, the concave portion is a hole 30 with the bottom whose periphery is closed by the supporting member 3. A plurality of concave portions are provided in the first surface 15. The radiation detection panel 2 is bonded to a region of the first surface 15 except the openings of the holes 30 in the first surface 15 through a bonding material such as double-sided adhesive tape or as an adhesive.

The provision of the holes 30 in the supporting member 3 makes it possible to reduce the weight of the supporting member 3, to increase the thickness of the supporting member 3 without increasing the weight of the supporting member 3, and thus to increase the rigidity of the supporting member 3. Since the radiation detection panel 2 is directly bonded to the first surface 15 of the supporting member 3, it is possible to prevent the positional deviation of the radiation detection panel 2 with respect to the supporting member 3. Therefore, it is possible to prevent the damage of the radiation detection panel 2.

It is preferable that the supporting member 3 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more. The hole 30 can be formed in the supporting member 3 by machine processing such as cutting. The hole 30 formed by machine processing typically has a circular shape. However, the shape of the hole 30 is not limited to the circular shape.

Figure 3:
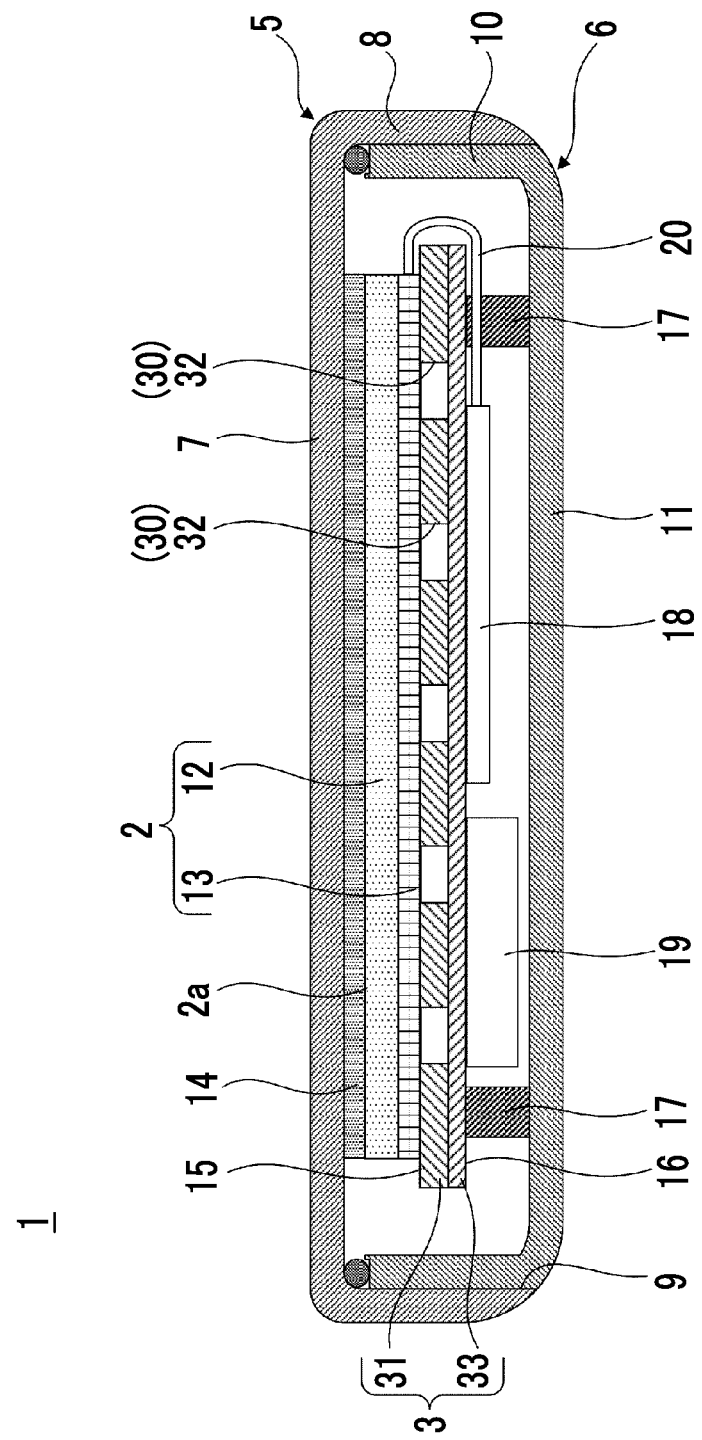
FIG. 3 is a cross-sectional view illustrating a modification example of a supporting member illustrated in FIG. 2.

The supporting member 3 may have a single-layer structure as illustrated in FIG. 2 or may have a multi-layer structure in which plate-shaped members made of the above-mentioned material are stacked as illustrated in FIG. 3. In a case in which the supporting member 3 has the multi-layer structure, the supporting member 3 may include a first layer 31 in which through holes 32 are formed and a second layer 33 on which the first layer 31 is stacked. The hole 30 is configured by closing one opening of the through hole 32 with the second layer 33.

Figure 4:
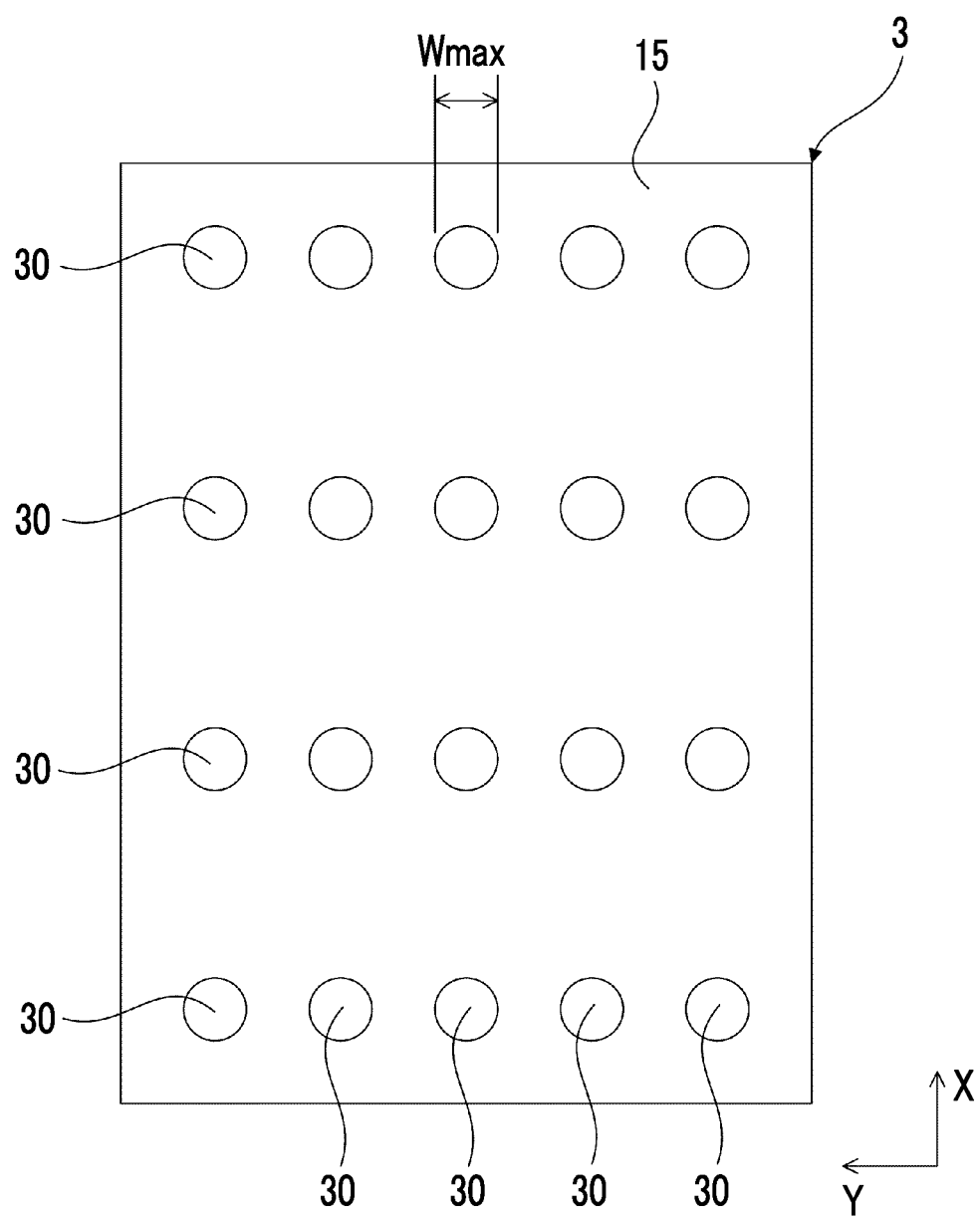
FIG. 4 is a plan view illustrating an example of the arrangement of concave portions provided in the supporting member illustrated in FIG. 2.
Figure 5:
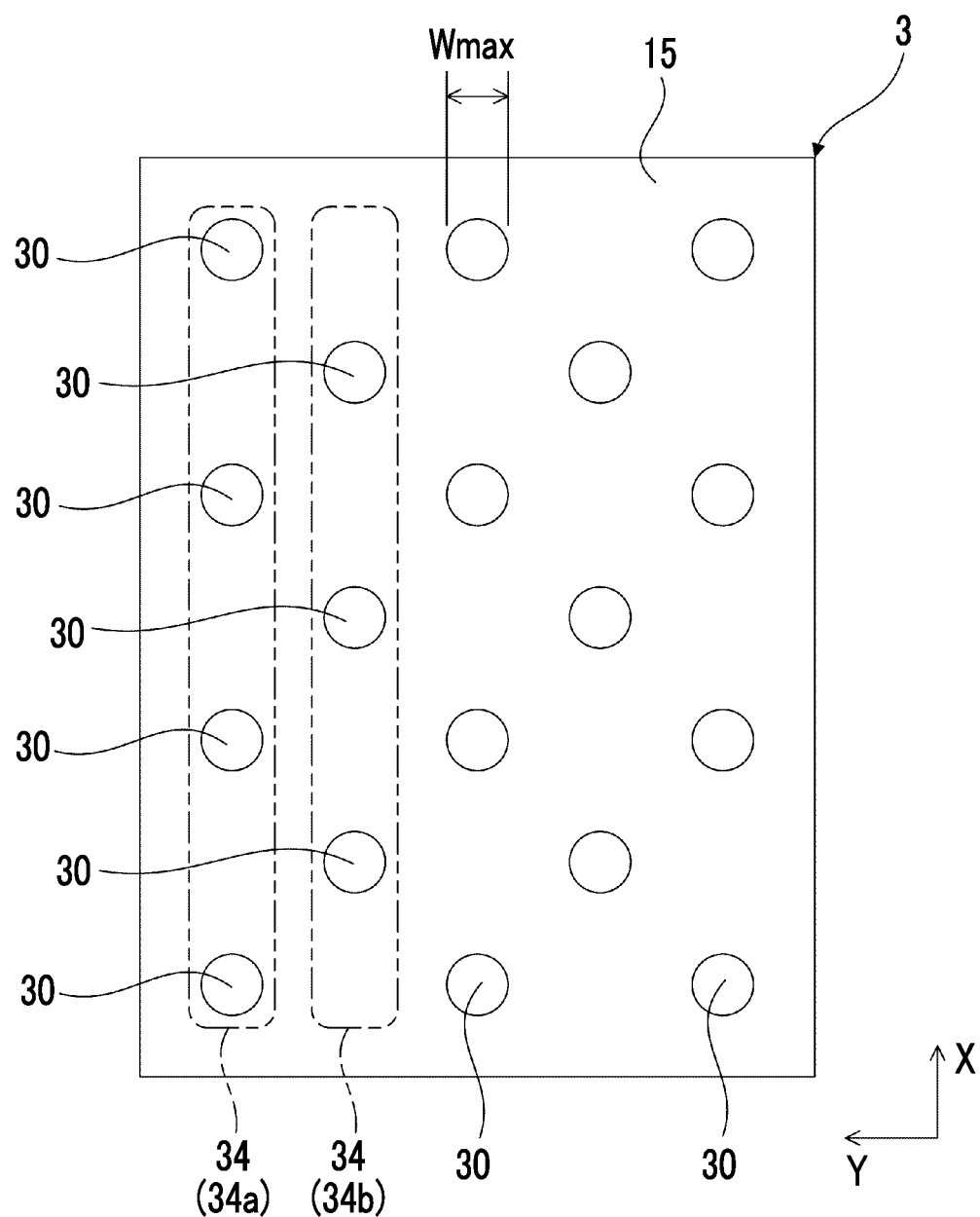
FIG. 5 is a plan view illustrating another example of the arrangement of the concave portions provided in the supporting member illustrated in FIG. 2.

FIGS. 4 and 5 illustrate an example of the arrangement of the holes 30.

The supporting member 3 is formed in a rectangular shape. Here, it is assumed that a direction along one set of opposite sides of the supporting member 3 in the first surface 15 of the supporting member 3 is a first direction X and a direction along the other set of opposite sides is a second direction Y. In the example illustrated in FIG. 4, a plurality of holes 30 are arranged at regular intervals in the first direction X and are arranged at regular intervals in the second direction Y. The plurality of holes 30 are arranged in a lattice shape.

In contrast, in the example illustrated in FIG. 5, a plurality of holes 30 are arranged at regular intervals in the first direction X and concave portion columns 34, each of which has the holes 30 arranged in the first direction X, are arranged at intervals in the second direction Y. Two adjacent concave portion columns 34 are a first column 34a and a second column 34b. A plurality of holes 30 included in the first column 34a are arranged so as to deviate from a plurality of holes 30 included in the second column 34b in the first direction X. That is, the holes 30 are arranged in zigzag.

In the example of the arrangement of the holes 30 illustrated in FIG. 5, the holes 30 can be arranged in the second direction Y more sparsely than those in the example of the arrangement of the holes 30 illustrated in FIG. 4. Therefore, it is possible to prevent the warpage of the supporting member 3 in the second direction and to further prevent the damage of the radiation detection panel 2.

Here, the maximum value (opening size) Wmax of the opening dimension of the hole 30 in the first surface 15 is preferably less than 52.5 mm and more preferably equal to or less than 40 mm. For example, local stress is applied to the radiation detection panel 2 in a case in which the top plate 7 of the housing 4 is stepped on. In general, the minimum value of the size of the heel of an adult is 52.5 mm according to the "Human Body Size and Shape Database" by the National Institute of Advanced Industrial Science and Technology (AIST). In a case in which the maximum value Wmax of the opening dimension of the hole 30 is less than 52.5 mm, at least a portion of the load applied from the heel to the top plate 7 can be supported by the first surface 15 of the supporting member 3, regardless of the positional relationship between the heel and the hole 30, and it is possible to further prevent the damage of the radiation detection panel 2. It is assumed that the size of the heel is a distance between the points where a straight line drawn from a heel point at a position corresponding to 16% of the foot length along the axis of the foot (a straight line connecting the heel point and the second finger tip) so as to be perpendicular to the axis of the foot intersects the inside and outside of the contour in the outline of the sole of the foot.

Figure 6:
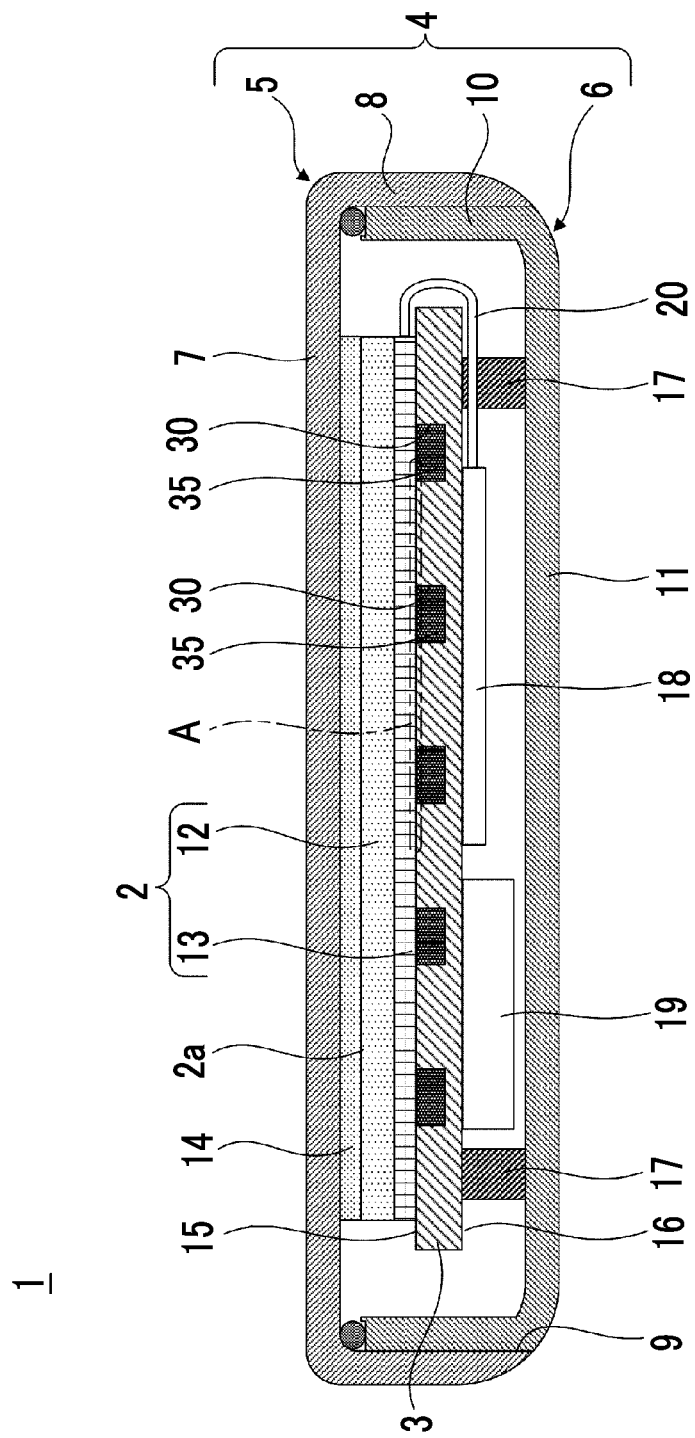
FIG. 6 is a cross-sectional view illustrating another modification example of the supporting member illustrated in FIG. 2.

In the example illustrated in FIGS. 2 and 3, the hole 30 is a void. However, as illustrated in FIG. 6, the hole 30 may be filled with a filler 35. In order to reduce the weight of the supporting member 3, the filler 35 has a lower density than the material (for example, an aluminum alloy, a magnesium alloy, or a fiber reinforced resin) forming the supporting member 3 and is made of, for example, a silicon-based or urethane-based foamed material.

In a case in which the hole 30 is filled with the filler 35, the local warpage of the radiation detection panel 2 sunk in the holes 30 is prevented. In addition, in a case in which the hole 30 is filled with the filler 35, the bonding area between the radiation detection panel 2 and the supporting member 3 increases and the positional deviation of the radiation detection panel 2 with respect to the supporting member 3 is prevented. Therefore, it is possible to further prevent the damage of the radiation detection panel 2. The periphery of the hole 30 is closed by the supporting member 3 and the filler 35 filling the hole 30 is surrounded by the supporting member 3. Therefore, even in a case in which the adhesion of the filler 35 made of a foamed material to the supporting member 3 is reduced, the positional deviation of the filler 35 with respect to the supporting member 3 is reliably prevented.

Figure 7:
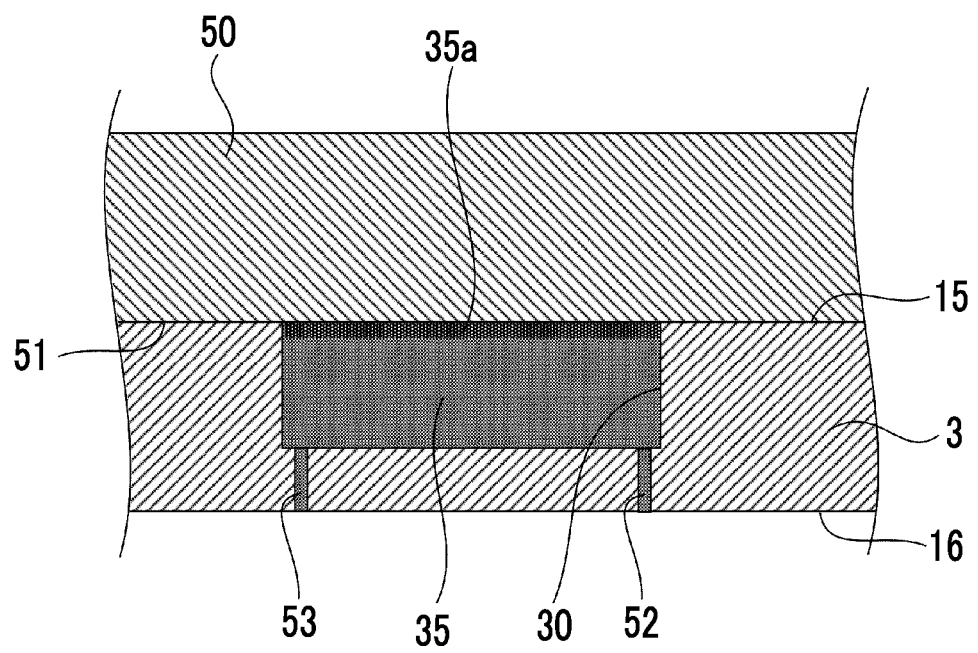
FIG. 7 is a diagram schematically illustrating a method for manufacturing the supporting member illustrated in FIG. 6.

In a case in which the filler 35 is made of a foamed material, it is preferable that a surface layer 35a (see FIG. 7) of the filler 35 exposed from the first surface 15 of the supporting member 3 is a skin layer with a higher density than the inside of the filler 35 except the surface layer 35a. In this case, it is possible to increase the bonding area of the surface of the filler 35 and to further prevent the positional deviation of the radiation detection panel 2 with respect to the supporting member 3. The surface layer 35a (skin layer) with a relatively high density can be formed using a jig 50 having a flat molding surface 51. In the supporting member 3, an inlet 52 and an outlet 53 that extend from the hole 30 to the second surface 16 may be formed in each hole 30 and a foamed material may be injected from the inlet 52 with the first surface 15 of the supporting member 3 coming into close contact with the molding surface 51 of the jig 50.

In some cases, the filler 35 made of a foamed material is convex or concave with respect to the first surface 15 of the supporting member 3. In this case, a tape member interposed between the first surface 15 and the radiation detection panel 2 and a tape member interposed between the filler 35 and the radiation detection panel 2 may be formed with different thicknesses and the amount of unevenness of the filler 35 with respect to the first surface 15 may be absorbed by the difference in thickness between the tape members.

In general, the filler 35 made of a foamed material has a lower thermal conductivity than the material (for example, an aluminum alloy, a magnesium alloy, or a fiber reinforced resin) forming the supporting member 3. Therefore, it is preferable that the hole 30 and the filler 35 are formed in at least an overlap region A which overlaps the circuit substrate 18 in the first surface 15 of the supporting member 3. In this case, it is possible to prevent heat generated from an electronic component mounted on the circuit substrate 18 from being transmitted to the radiation detection panel 2 and to reduce noise generated in the radiation detection panel 2 due to heat.

Figure 8:
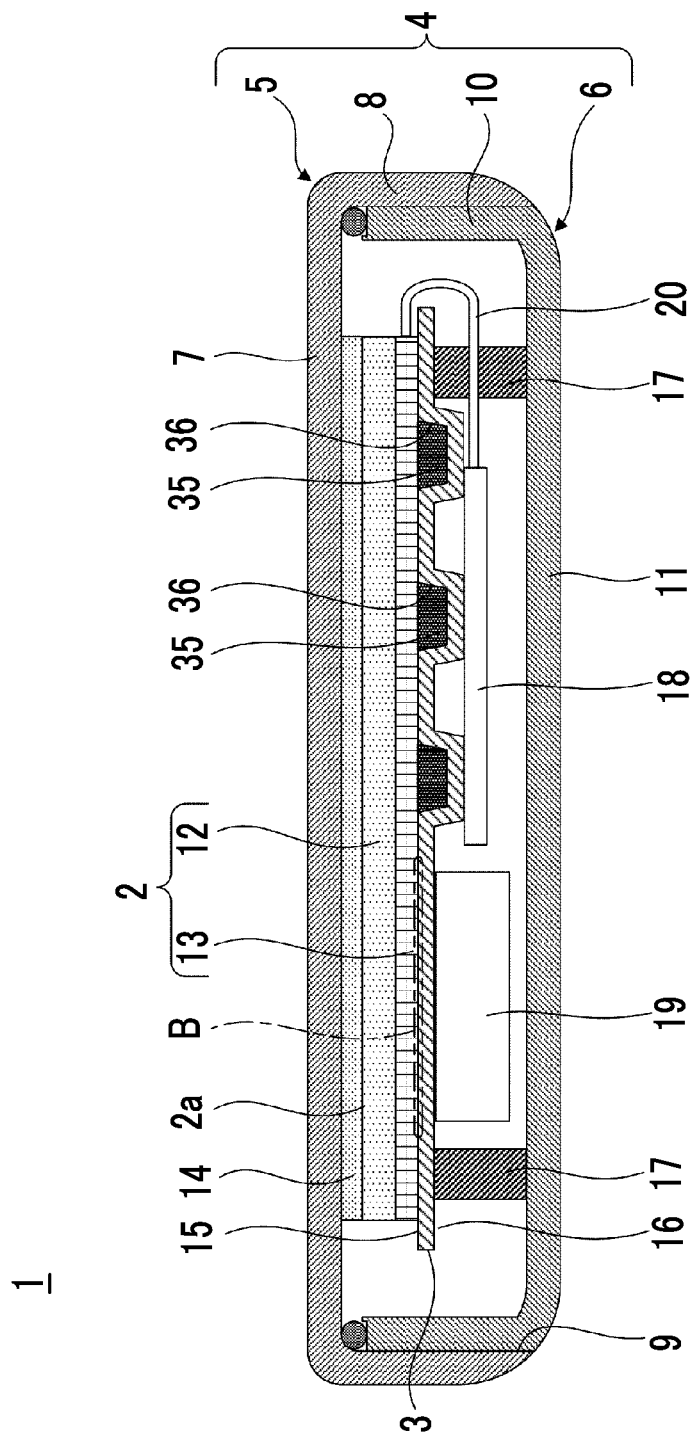
FIG. 8 is a cross-sectional view illustrating still another modification example of the supporting member illustrated in FIG. 2.

The concave portion provided in the first surface 15 of the supporting member 3 is not limited to the hole 30. A concave portion illustrated in FIG. 8 is an embossed portion 36 which is a convex portion on the second surface 16 of the supporting member 3. The periphery of the embossed portion 36 is closed by the supporting member 3. A plurality of embossed portions 36 are provided in the first surface 15. The embossed portion 36 can be formed by press working such as squeezing. The embossed portion 36 can be formed in an appropriate shape, such as a circular shape or a rectangular shape, by press working.

The plurality of embossed portions 36 may be arranged in a lattice shape as in the example of the arrangement of the holes 30 illustrated in FIG. 4 and is preferably arranged in zigzag as in the example of the arrangement of the holes 30 illustrated in FIG. 5. In addition, it is preferable that the maximum value of the opening dimension of the embossed portion 36 in the first surface 15 is less than 52.5 mm. The embossed portion 36 may be a void and is preferably filled with the filler 35.

Here, the power supply unit 19 provided on the second surface 16 of the supporting member 3 is thicker than the circuit substrate 18. Preferably, the embossed portion 36 which is a convex portion on the second surface 16 of the supporting member 3 is provided in a region except an overlap region B that overlaps the power supply unit 19 in the first surface 15 of the supporting member 3.

Figure 9:
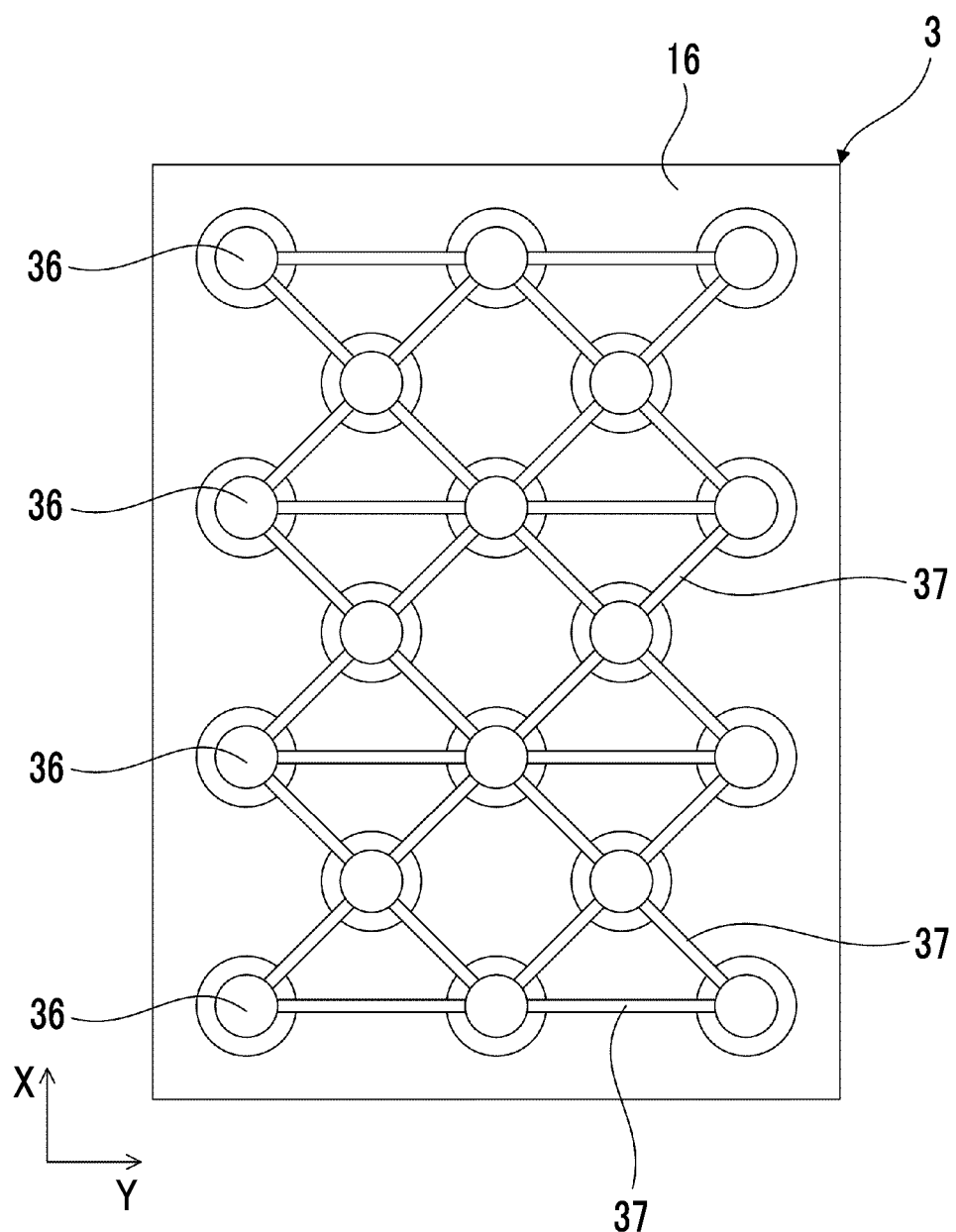
FIG. 9 is a rear view illustrating yet another modification example of the supporting member illustrated in FIG. 2.

In addition, as illustrated in FIG. 9, a rib 37 that connects two embossed portions 36 may be appropriately provided on the second surface 16 of the supporting member 3. The rib 37 makes it possible to further increase the rigidity of the supporting member 3 and to further prevent the damage of the radiation detection panel 2.

Figure 10:
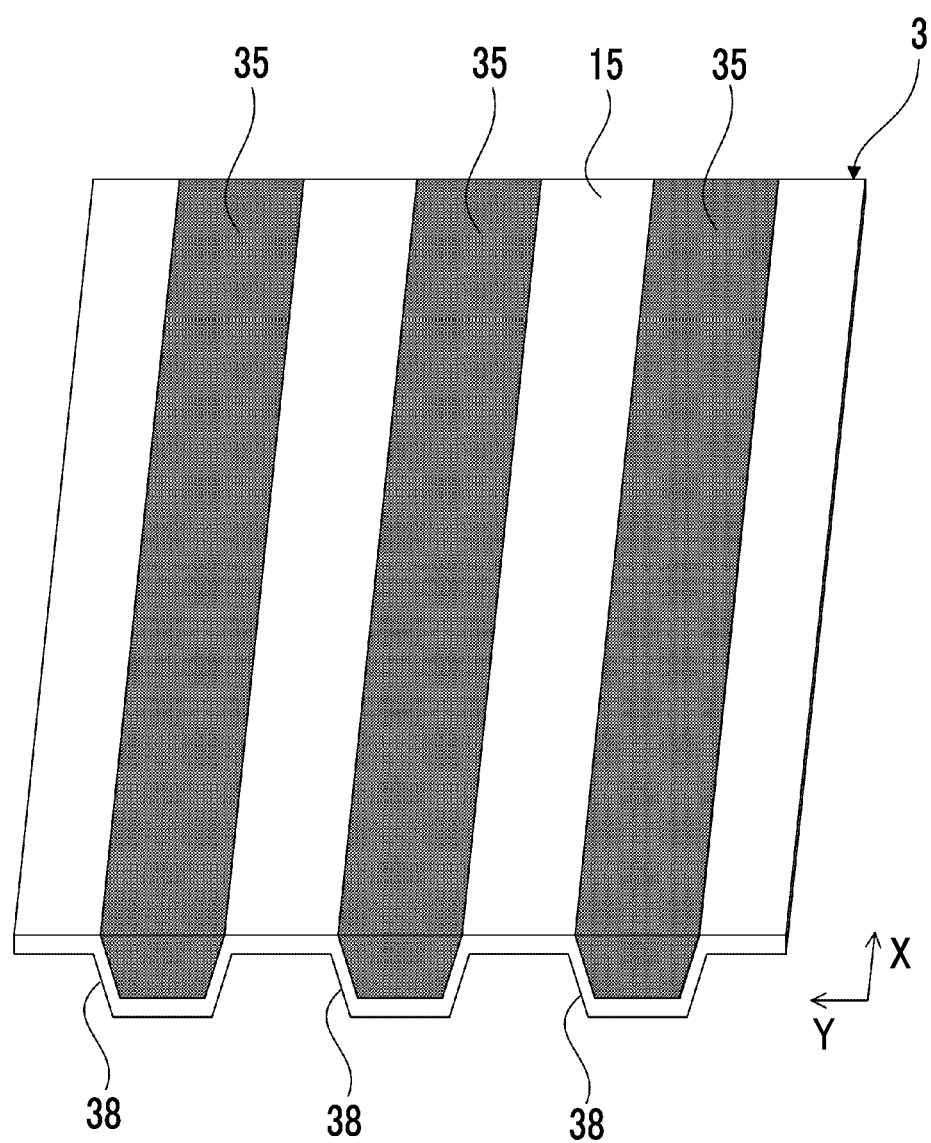
FIG. 10 is a perspective view illustrating still yet another modification example of the supporting member illustrated in FIG. 2.

The periphery of each of the hole 30 and the embossed portion 36 is closed by the supporting member 3. However, the concave portion provided in the first surface 15 of the supporting member 3 is not limited to the structure in which the periphery of the concave portion is closed by the supporting member 3. A concave portion illustrated in FIG. 10 is an embossed portion 38 that is formed in a groove shape extending in the first direction X of the supporting member 3. Both ends of the embossed portion 38 in the first direction are open. A plurality of embossed portions 38 are arranged at intervals in the second direction Y. The embossed portion 38 may be a void and is preferably filled with the filler 35. The filler 35 filling the embossed portion 38 is engaged with the supporting member 3 in the second direction Y. Therefore, the positional deviation of the filler 35 with respect to the supporting member 3 in the second direction Y is reliably prevented.

Figure 11:
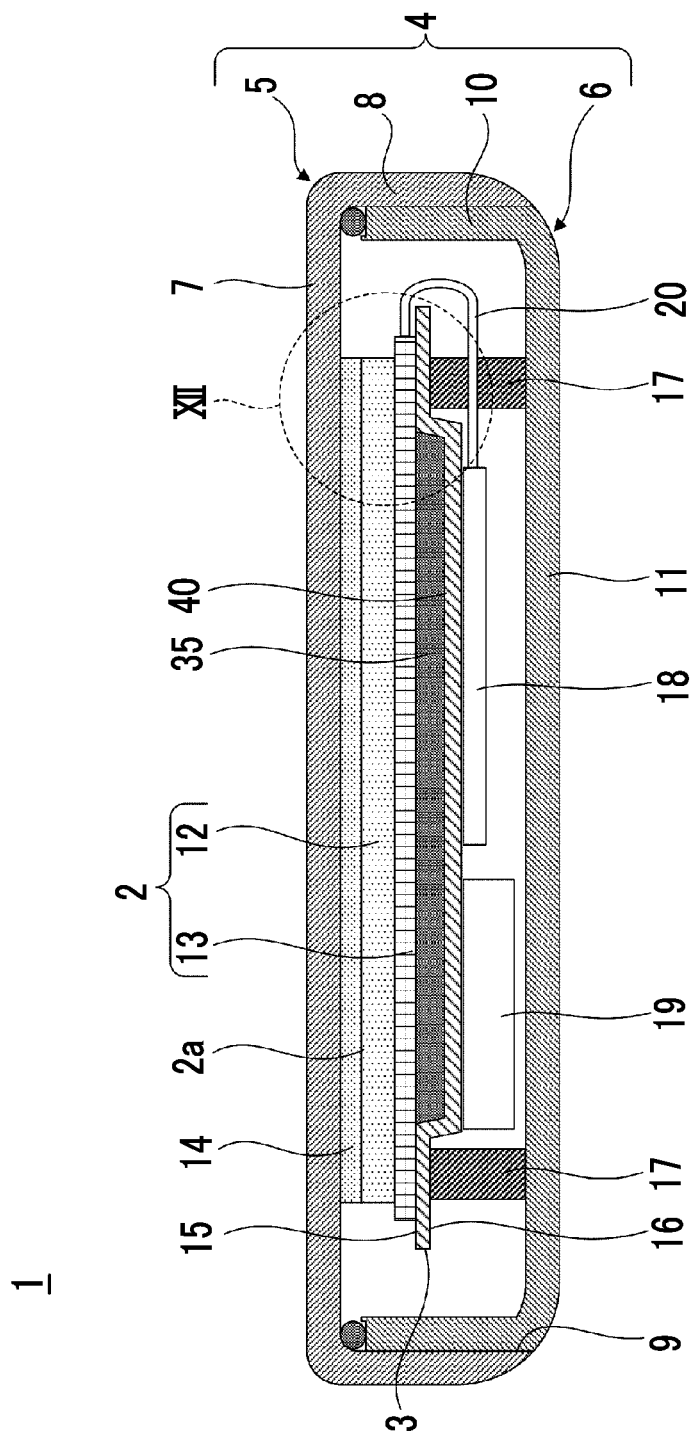
FIG. 11 is a cross-sectional view illustrating yet still another modification example of the supporting member illustrated in FIG. 2.
Figure 12:
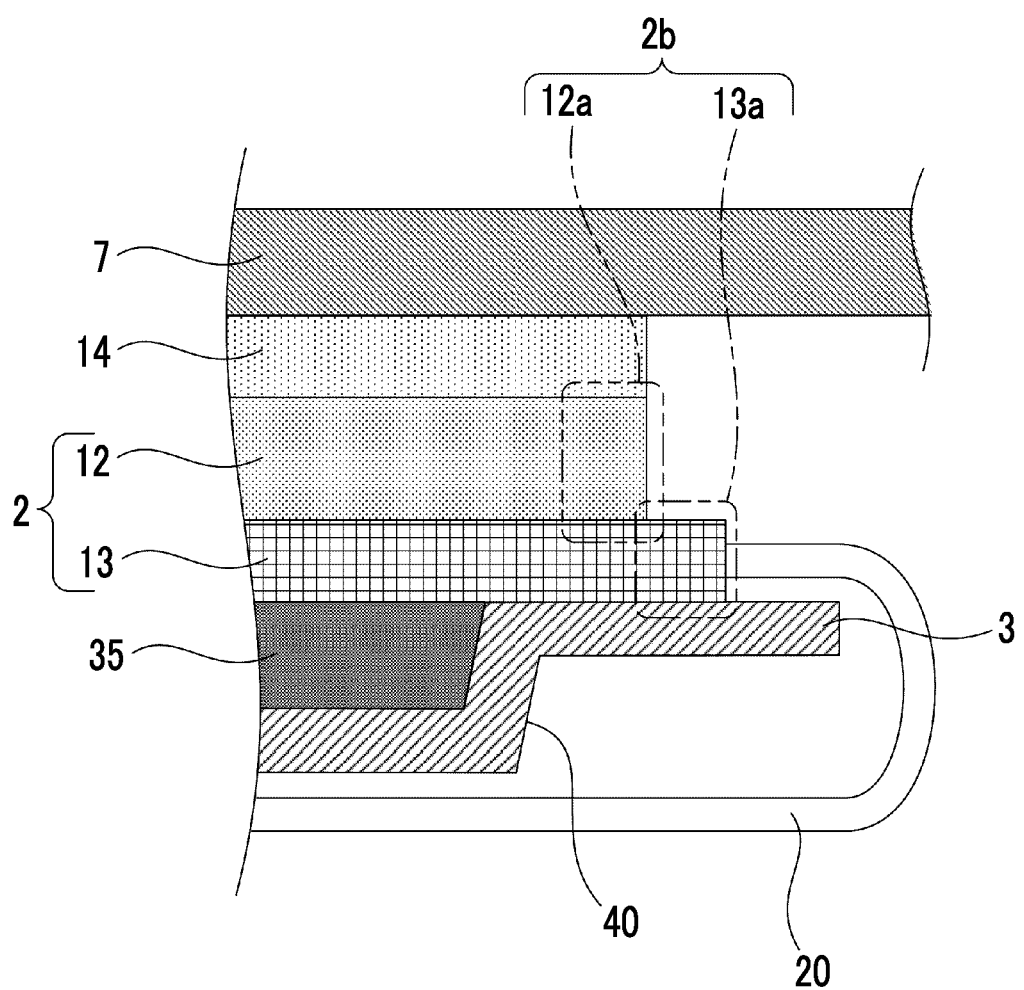
FIG. 12 is an enlarged cross-sectional view illustrating a portion surrounded by a dashed circular line XII of FIG. 11.

In the above description, a plurality of holes 30, embossed portions 36, or embossed portions 38 as the concave portions provided in the first surface 15 of the supporting member 3 are provided in the first surface 15. However, one concave portion may be provided. In an example illustrated in FIGS. 11 and 12, one concave portion 40 is provided in the first surface 15 of the supporting member 3. The concave portion 40 is filled with the filler 35. In addition, in the example illustrated in FIGS. 11 and 12, the concave portion 40 is an embossed portion which is a convex portion on the second surface 16 of the supporting member 3. However, the concave portion 40 may be a hole with a bottom. The concave portion 40 is smaller than the radiation detection panel 2. An outer peripheral portion 2b of the radiation detection panel 2 is supported by the supporting member 3. In addition, it is preferable that the entire outer peripheral portion 2b is supported by the supporting member 3. For example, in a case in which the supporting member 3 is partially cut out in order to reduce weight, a portion of the outer peripheral portion 2b in a circumferential direction may deviate from the supporting member 3. In contrast, a central portion of the radiation detection panel 2 except the outer peripheral portion 2b is supported by the filler 35.

Here, the filler 35 having a lower density than the material (for example, an aluminum alloy, a magnesium alloy, or a fiber reinforced resin) forming the supporting member 3 is more easily deformed than the supporting member 3. It is preferable that the buffer member 14 provided between the radiation detection panel 2 and the top plate 7 of the housing 4 is more flexible than the filler 35 in order to prevent the concentration of stress on a boundary portion between the central portion and the outer peripheral portion 2b of the radiation detection panel 2 caused by the sinking of the central portion in the concave portion 40 in a case in which a load is locally applied to the central portion of the radiation detection panel 2. Flexibility is represented by 25% compressive load (compressive load required for 25% deformation in the thickness direction) or 50% compressive load (compressive load required for 50% deformation in the thickness direction). As the compressive load becomes smaller, flexibility becomes higher. The compressive load is a value measured by a hardness test method defined by JIS K 6400-2. Since the buffer member 14 that is relatively flexible is deformed before the filler 35, the deformation of the filler 35 is prevented and the sinking of the central portion of the radiation detection panel 2 in the concave portion 40 is prevented. Therefore, the concentration of stress on the boundary portion between the central portion and the outer peripheral portion 2b of the radiation detection panel 2 is reduced. As a result, it is possible to prevent the damage of the radiation detection panel 2.

In addition, the radiation detection panel 2 includes the scintillator 12 and the detection substrate 13 and an outer peripheral portion 13a of the detection substrate 13 protrudes outward from an outer peripheral portion 12a of the scintillator 12. In this case, it is preferable that the outer peripheral portion 2b of the radiation detection panel 2 supported by the supporting member 3 includes the outer peripheral portion 13a of the detection substrate 13 and the outer peripheral portion 12a of the scintillator 12. The detection substrate 13 is typically a glass substrate and is relatively fragile. The scintillator 12 is stacked on the detection substrate 13 to reinforce the detection substrate 13. Since the outer peripheral portion 2b of the radiation detection panel 2 includes the outer peripheral portion 13a of the detection substrate 13 and the outer peripheral portion 12a of the scintillator 12, the range from the outer periphery of the detection substrate 13 to the scintillator 12 is supported by the supporting member 3 made of a single material. Therefore, the concentration of stress on the outer periphery of the scintillator 12 whose strength varies is reduced and it is possible to further prevent the damage of the radiation detection panel 2.

Figure 13:
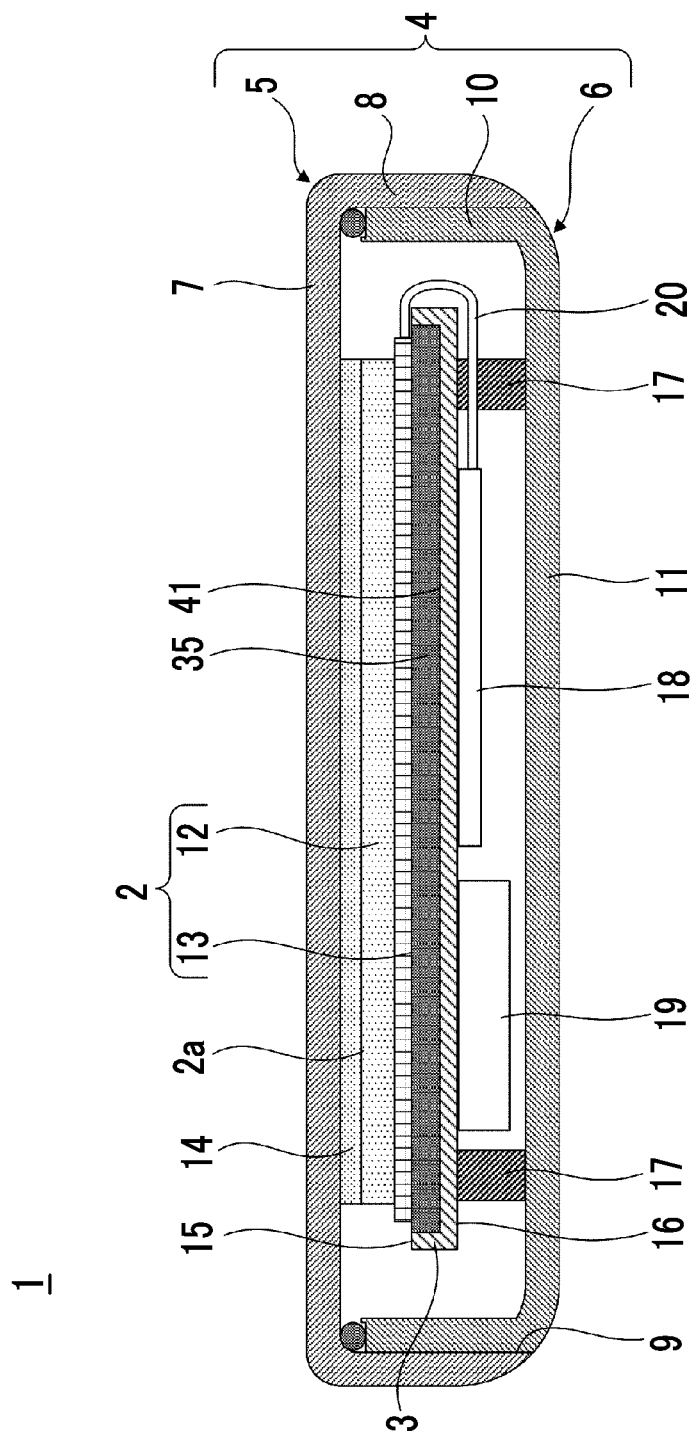
FIG. 13 is a cross-sectional view illustrating still yet another modification example of the supporting member illustrated in FIG. 2.

The range from the outer periphery of the detection substrate 13 to the scintillator 12 may be supported by a single material in order to reduce the concentration of stress on the outer periphery of the scintillator 12 whose strength varies or may be supported by the filler 35 instead of the supporting member 3. In the example illustrated in FIG. 13, one concave portion 41 is provided in the first surface 15 of the supporting member 3. The concave portion 41 is filled with the filler 35. The concave portion 41 is larger than the radiation detection panel 2 and the entire radiation detection panel 2 is supported by the filler 35. In this case, the range from the outer periphery of the detection substrate 13 to the scintillator 12 is supported by the filler 35 made of a single material. Therefore, the concentration of stress on the outer periphery of the scintillator 12 whose strength varies is reduced and it is possible to further prevent the damage of the radiation detection panel 2.

Figure 14:
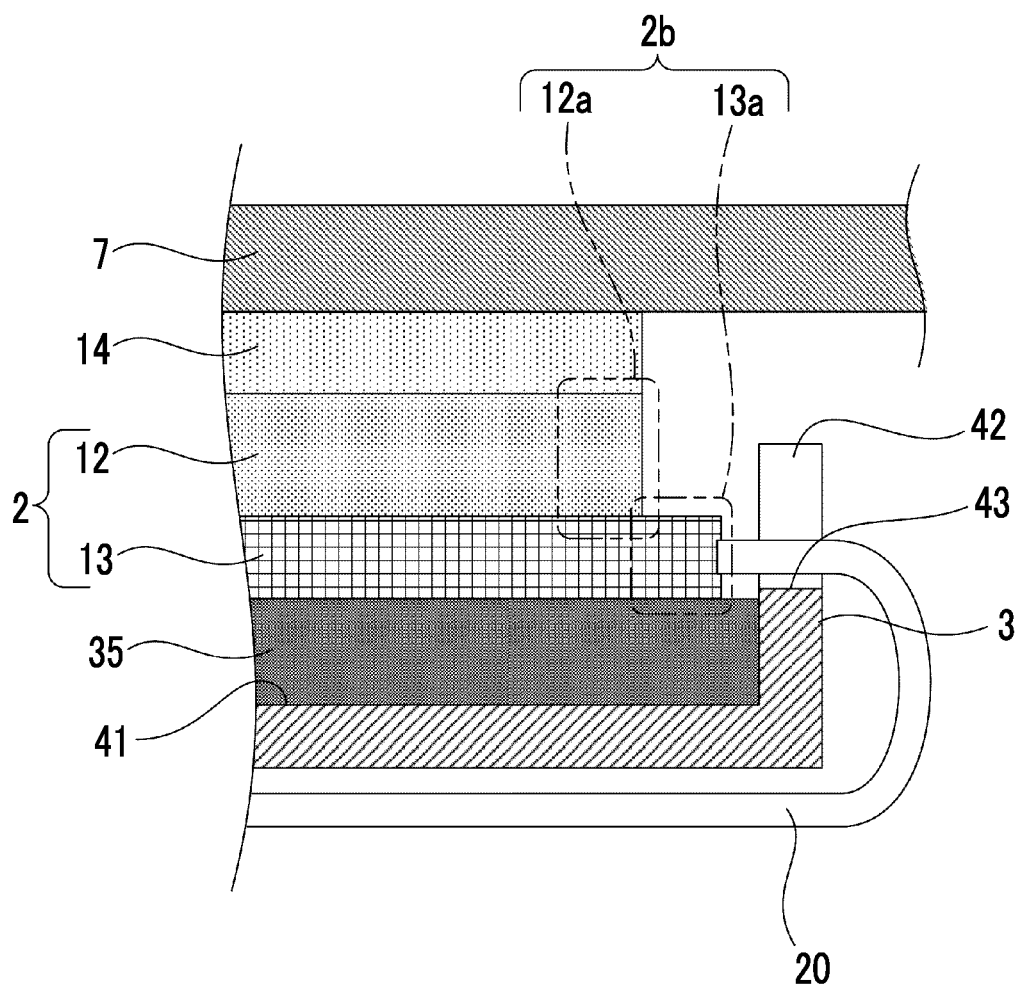
FIG. 14 is an enlarged cross-sectional view illustrating a main portion of a modification example of the supporting member illustrated in FIG. 13.

In a case in which the concave portion 41 is larger than the radiation detection panel 2, the supporting member 3 includes a frame portion 42 that surrounds the outer periphery of the radiation detection panel 2 as illustrated in FIG. 14. For example, in a case in which the radiation detection device 1 falls and an impact is applied to the outer frame 8 (see FIG. 13) and the inner frame 10 (see FIG. 13) of the housing 4, since the outer periphery of the radiation detection panel 2 is surrounded by the frame portion 42, it is possible to protect the radiation detection panel 2 from the impact. Therefore, it is possible to further prevent the damage of the radiation detection panel 2. In addition, a cutout 43 may be appropriately provided in a part which can interfere with the flexible substrate 20 in the frame portion 42.

As described above, a radiation detection device disclosed in the specification comprises: a radiation detection panel; a supporting member that supports the radiation detection panel with a first surface; and a housing that accommodates the radiation detection panel and the supporting member. The supporting member has one or more concave portions provided in the first surface.

In the radiation detection device disclosed in the specification, the periphery of the concave portion is closed by the supporting member and a maximum value of an opening dimension of the first surface of the concave portion is less than 52.5 mm.

In the radiation detection device disclosed in the specification, the radiation detection panel and the supporting member are formed in a rectangular shape. In a case in which a direction along one set of opposite sides of the supporting member in the first surface is a first direction and a direction along the other set of opposite sides is a second direction, the concave portions are arranged at intervals in the first direction and concave portion columns, each of which includes the concave portions arranged in the first direction, are arranged at intervals in the second direction. In a case in which two adjacent concave portion columns are a first column and a second column, a plurality of the concave portions included in the first column are arranged so as to deviate from a plurality of the concave portions included in the second column in the first direction.

In the radiation detection device disclosed in the specification, the concave portion is filled with a filler having a lower density than a material forming the supporting member.

In the radiation detection device disclosed in the specification, the filler is made of a foamed material and a surface layer of the filler exposed from the first surface has a higher density than the inside of the filler except the surface layer.

The radiation detection device disclosed in the specification further comprises a buffer member that is provided between a radiation incident surface of the radiation detection panel and a top plate of a housing which covers the radiation incident surface. The buffer member is more flexible than the filler.

In the radiation detection device disclosed in the specification, the concave portion is smaller than the radiation detection panel and an outer peripheral portion of the radiation detection panel is supported by the supporting member.

In the radiation detection device disclosed in the specification, the radiation detection panel includes: a scintillator that emits fluorescence corresponding to an amount of incident radiation; and a detection substrate which includes a plurality of pixels detecting the fluorescence emitted from the scintillator and on which the scintillator is stacked. An outer peripheral portion of the detection substrate protrudes outward from an outer peripheral portion of the scintillator. The outer peripheral portion of the radiation detection panel supported by the supporting member includes the outer peripheral portion of the detection substrate and the outer peripheral portion of the scintillator.

In the radiation detection device disclosed in the specification, the concave portion is larger than the radiation detection panel and the entire radiation detection panel is supported by the filler.

In the radiation detection device disclosed in the specification, the supporting member includes a frame portion that surrounds the outer periphery of the radiation detection panel.

The radiation detection device disclosed in the specification further comprises a circuit substrate that is provided on a second surface opposite to the first surface of the supporting member. The concave portion is provided in at least an overlap region that overlaps the circuit substrate in the first surface and the filler is made of a material having a lower thermal conductivity than the material forming the supporting member.

In the radiation detection device disclosed in the specification, the concave portion is a hole with a bottom.

In the radiation detection device disclosed in the specification, the supporting member includes: a first layer in which a through hole is formed; and a second layer on which the first layer is stacked. The hole is configured by closing one opening of the through hole with the second layer.

In the radiation detection device disclosed in the specification, the concave portion is an embossed portion which is a convex portion on the second surface opposite to the first surface of the supporting member.

The radiation detection device disclosed in the specification further comprises a power supply unit that is provided on the second surface of the supporting member and supplies power to the radiation detection panel. The embossed portion is provided in a region except an overlap region that overlaps the power supply unit in the first surface.

EXPLANATION OF REFERENCES

1: radiation detection device
2: radiation detection panel
2a: radiation incident surface of radiation detection panel
2b: outer peripheral portion of radiation detection panel
3: supporting member
4: housing
5: front member
6: back member
7: top plate
8: outer frame
9: opening portion
10: inner frame
11: bottom
12: scintillator
12a: outer peripheral portion of scintillator
13: detection substrate
13a: outer peripheral portion of detection substrate
14: buffer member
15: first surface of supporting member
16: second surface of supporting member
17: spacer
18: circuit substrate
19: power supply unit
20: flexible substrate
30: hole with bottom (concave portion)
31: first layer
32: through hole
33: second layer
34: concave portion column
34a: first column
34b: second column
35: filler
35a: surface layer of filler
36: embossed portion (concave portion)
37X: rib
37Y: rib
38: embossed portion (concave portion)
40: concave portion
41: concave portion
42: frame portion
50: jig
51: molding surface
52: inlet
53: outlet
A: overlap region with circuit substrate
B: overlap region with power supply unit
Wmax: maximum value of opening dimension of concave portion
X: first direction
Y: second direction

What is claimed is:

1. A radiation detection device comprising:
a radiation detection panel;
a supporting member that supports the radiation detection panel at a side of a first surface of the supporting member; and
a housing that accommodates the radiation detection panel and the supporting member,
wherein the supporting member has one or more concave portions at the first surface.

2. The radiation detection device according to claim 1, wherein periphery of each of the one or more concave portions is closed by the supporting member, and
a maximum value of an opening dimension of the one or more concave portions at the first surface is less than 52.5 mm.

3. The radiation detection device according to claim 2, wherein the radiation detection panel and the supporting member are formed in a rectangular shape,
in a case in which a direction along one set of opposite sides of the supporting member in the first surface is a first direction and a direction along other set of opposite sides of the supporting member in the first surface is a second direction, the concave portions are arranged at interval in the first direction and concave portion columns, each of which includes the concave portions arranged in the first direction, are arranged at interval in the second direction, and
in a case in which two adjacent concave portion columns among the concave portion columns are a first column and a second column, a plurality of the concave portions included in the first column are arranged so as to deviate from a plurality of the concave portions included in the second column in the first direction.

4. The radiation detection device according to claim 1, wherein the concave portion is filled with a filler having a lower density than a material forming the supporting member.

5. The radiation detection device according to claim 4, wherein the filler is made from a foamed material, and
a surface layer of the filler exposed from the first surface has a higher density than an inside of the filler except the surface layer.

6. The radiation detection device according to claim 5, further comprising:
a buffer member that is provided between a radiation incident surface of the radiation detection panel and a top plate of the housing which covers the radiation incident surface,
wherein the buffer member is more flexible than the filler.

7. The radiation detection device according to claim 5, wherein the concave portion is smaller than the radiation detection panel, and
an outer peripheral portion of the radiation detection panel is supported by the supporting member.

8. The radiation detection device according to claim 7, wherein the radiation detection panel comprises:
a scintillator that emits fluorescence corresponding to an amount of incident radiation; and
a detection substrate which comprises a plurality of pixels detecting the fluorescence emitted from the scintillator and on which the scintillator is stacked,
an outer peripheral portion of the detection substrate protrudes more outward than an outer peripheral portion of the scintillator, and
the outer peripheral portion of the radiation detection panel supported by the supporting member comprises the outer peripheral portion of the detection substrate and the outer peripheral portion of the scintillator.

9. The radiation detection device according to claim 5, wherein the concave portion is larger than the radiation detection panel, and an entire of one surface of the radiation detection panel is supported by the filler.

10. The radiation detection device according to claim 9, wherein the supporting member comprises a frame portion that surrounds an outer periphery of the radiation detection panel.

11. The radiation detection device according to claim 5, further comprising:
a circuit substrate that is provided at a side of a second surface of the supporting member which is opposite to the first surface of the supporting member,
wherein the concave portion is provided in at least an overlap region that overlaps the circuit substrate in the first surface, and
the filler is made from a material having a lower thermal conductivity than the material forming the supporting member.

12. The radiation detection device according to claim 4, wherein the concave portion is smaller than the radiation detection panel, and
an outer peripheral portion of the radiation detection panel is supported by the supporting member.

13. The radiation detection device according to claim 12, wherein the radiation detection panel comprises:
a scintillator that emits fluorescence corresponding to an amount of incident radiation; and
a detection substrate which comprises a plurality of pixels detecting the fluorescence emitted from the scintillator and on which the scintillator is stacked,
an outer peripheral portion of the detection substrate protrudes more outward than an outer peripheral portion of the scintillator, and
the outer peripheral portion of the radiation detection panel supported by the supporting member comprises the outer peripheral portion of the detection substrate and the outer peripheral portion of the scintillator.

14. The radiation detection device according to claim 4, wherein the concave portion is larger than the radiation detection panel, and
an entire of one surface of the radiation detection panel is supported by the filler.

15. The radiation detection device according to claim 14, wherein the supporting member comprises a frame portion that surrounds an outer periphery of the radiation detection panel.

16. The radiation detection device according to claim 4, further comprising:
a circuit substrate that is provided at a side of a second surface of the supporting member which is opposite to the first surface of the supporting member,
wherein the concave portion is provided in at least an overlap region that overlaps the circuit substrate in the first surface, and
the filler is made from a material having a lower thermal conductivity than the material forming the supporting member.

17. The radiation detection device according to claim 1, wherein the concave portion is a hole with a bottom.

18. The radiation detection device according to claim 17, wherein the supporting member comprises:
a first layer in which a through hole is formed; and
a second layer on which the first layer is stacked, and
the hole is configured by closing one opening of the through hole with the second layer.

19. The radiation detection device according to claim 1, wherein the concave portion is an embossed portion which is a convex portion on the second surface opposite to the first surface of the supporting member.

20. The radiation detection device according to claim 19, further comprising:
a power supply unit that is provided at a side of the second surface of the supporting member and supplies power to the radiation detection panel,
wherein the embossed portion is provided in a region except an overlap region that overlaps the power supply unit in the first surface.

* * * * *